United States Patent
Yeh

[11] Patent Number: 5,547,141
[45] Date of Patent: Aug. 20, 1996

[54] FISHHING REEL WITH AN AMBIDEXTROUS HANDLE

[76] Inventor: Shih-yuan Yeh, No. 2-4, Chen Hsing Rd., Tai Ping Hsiang, Taichung Hsien, Taiwan

[21] Appl. No.: 493,293

[22] Filed: Jun. 21, 1995

Related U.S. Application Data

[63] Continuation-in-part of Ser. No. 188,574, Jan. 28, 1994, abandoned.

[51] Int. Cl.[6] .................................................. H01K 89/015
[52] U.S. Cl. ........................................... 242/270; 242/282
[58] Field of Search ..................................... 242/282, 270, 242/269, 271

[56] References Cited

U.S. PATENT DOCUMENTS

| | | | |
|---|---|---|---|
| 4,572,455 | 2/1986 | Noda | 242/282 |
| 4,725,018 | 2/1988 | Young | 242/282 |
| 4,732,343 | 3/1988 | Maruyama | 242/282 |
| 4,741,489 | 5/1988 | Emura et al. | 242/282 X |
| 4,775,113 | 10/1988 | Emura et al. | 242/282 X |
| 4,850,549 | 7/1989 | Sakumoto | 242/282 X |

FOREIGN PATENT DOCUMENTS

| 12925 | 1/1985 | Japan | 242/282 |
|---|---|---|---|

*Primary Examiner*—Joseph J. Hail, III
*Attorney, Agent, or Firm*—Poms, Smith, Lande & Rose

[57] ABSTRACT

A fishing reel includes a reel body including a first side frame, a second side frame and an elongated frame formed therebetween. A driven shaft is rotatably mounted in the elongated free. A drive shaft is detachably mounted in the driven shaft for rotating the driven shaft therewith. A handle portion is engaged with the drive shaft for rotating the drive shaft therewith. A cap is rotatably mounted around one of the first and second side plates. A stud is fixedly formed in the cap and is threadedly engaged in an inner thread of one distal end of the drive shaft for retaining the drive shaft in the driven shaft. A spool shaft is slidably mounted in the reel body and a spool is rotatably mounted around the spool shaft.

2 Claims, 4 Drawing Sheets

FISHHING REEL WITH AN AMBIDEXTROUS HANDLE

RELATED PRIOR ART

The present invention is a Continuation-In-Part Application of the Applicant's U.S. Ser. No. 08/188,574, filed on Jan. 28, 1994 now abandoned.

BACKGROUND OF THE INVENTION

Field of Invention

The present invention relates to a fishing reel, and more particularly to a fishing reel with an ambi-dexterous handle.

The present invention has arisen to mitigate and/or obviate disadvantages of the conventional fishing reel.

SUMMARY OF THE INVENTION

The primary objective of the present invention is to provide a fishing reel which is suitable for both right handed and left handed users and is easy to be assembled and dismantled.

In accordance with one aspect of the present invention, there is provided a fishing reel comprising a reel body including a first side frame, a second side frame and an elongated frame formed therebetween. A driven shaft is rotatably mounted in a passage of the elongated frame. A drive shaft is detachably mounted in a passage of the driven shaft for rotating the driven shaft and includes a first end and a second end. A handle portion is engaged with the second end of the drive shaft for rotating the drive shaft therewith.

A cap is rotatably mounted around one of the first and second side plates. A stud is fixedly formed in the cap and is threadedly engaged in an inner thread of the first end of the drive shaft for retaining the drive shaft in the passage of the driven shaft. A spool shaft is slidably mounted in the reel body and has a first end retained in the first side frame and a second end retained in the second side frame. A spool is rotatably mounted around the spool shaft and has a first end portion located adjacent to the first side frame and a second end portion located adjacent to the second side frame.

A drag washer is fixedly mounted on the second end portion of the spool. A compartment is defined in the second end portion of the spool for receiving a biasing member therein. A stop is mounted around the second end of the spool shaft and is urged on the biasing member such that a space is defined between the drag washer and the stop.

A transmission mechanism is mounted between the driven shaft and the spool shaft and includes a drive gear fixedly mounted around the driven shaft to rotate therewith. A pinion is fixedly engaged with the stop and is rotatably mounted around the second end of the spool shaft and is driven to rotate by means of the drive gear so as to rotate the stop therewith.

A rotation control mechanism is mounted on the first and second side frames and is engaged with the second end of the spool shaft such that the spool shaft together with the spool is moved by means of the rotation control mechanism between a first position where the stop is urged on the drag washer such that the spool is rotated in concert with the pinion by engagement of the stop and the drag washer, and a second position where the stop is disengaged with the drag washer.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
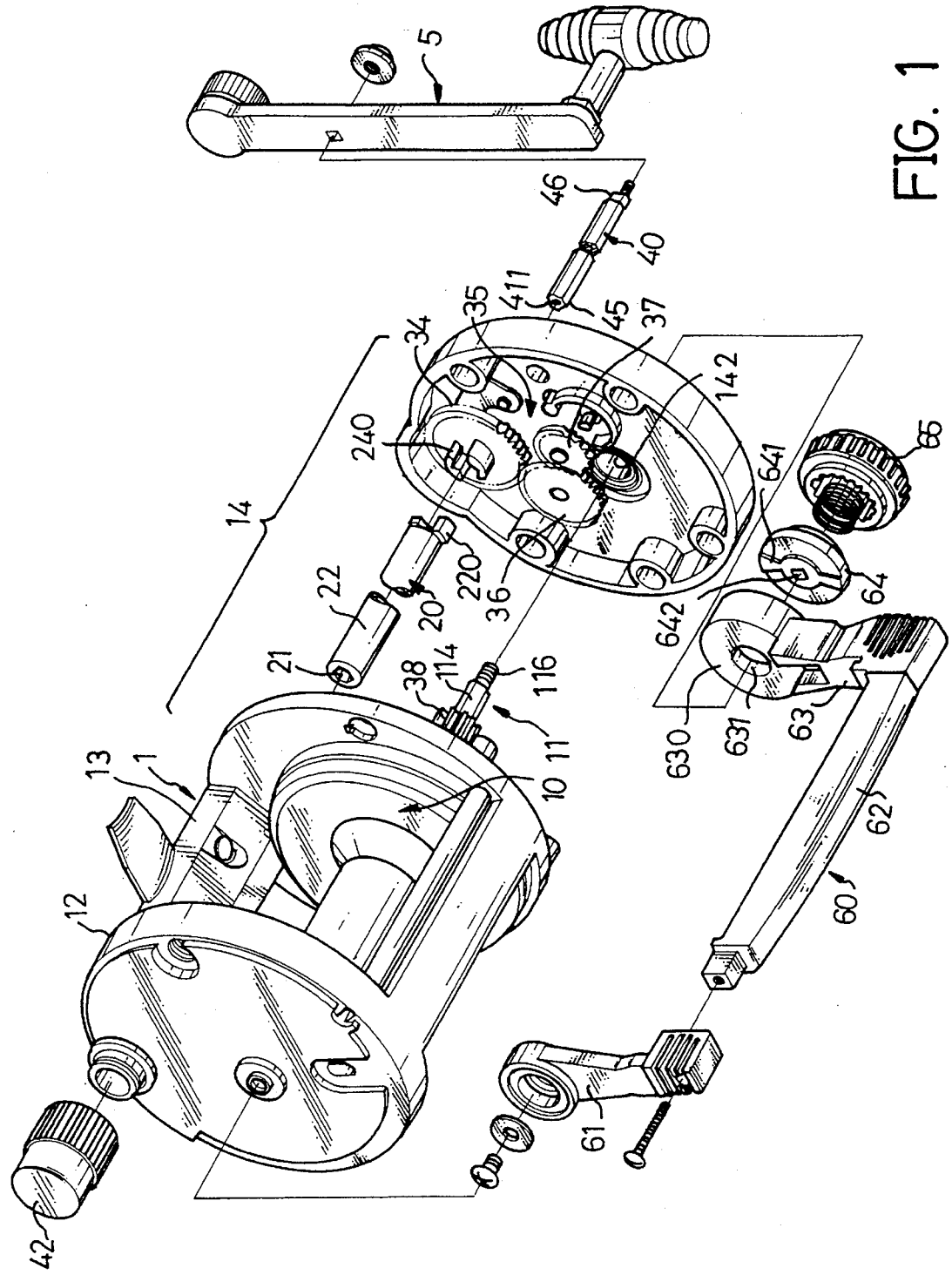
FIG. 1 is an exploded view of a fishing reel in accordance with the present invention.
Figure 2:
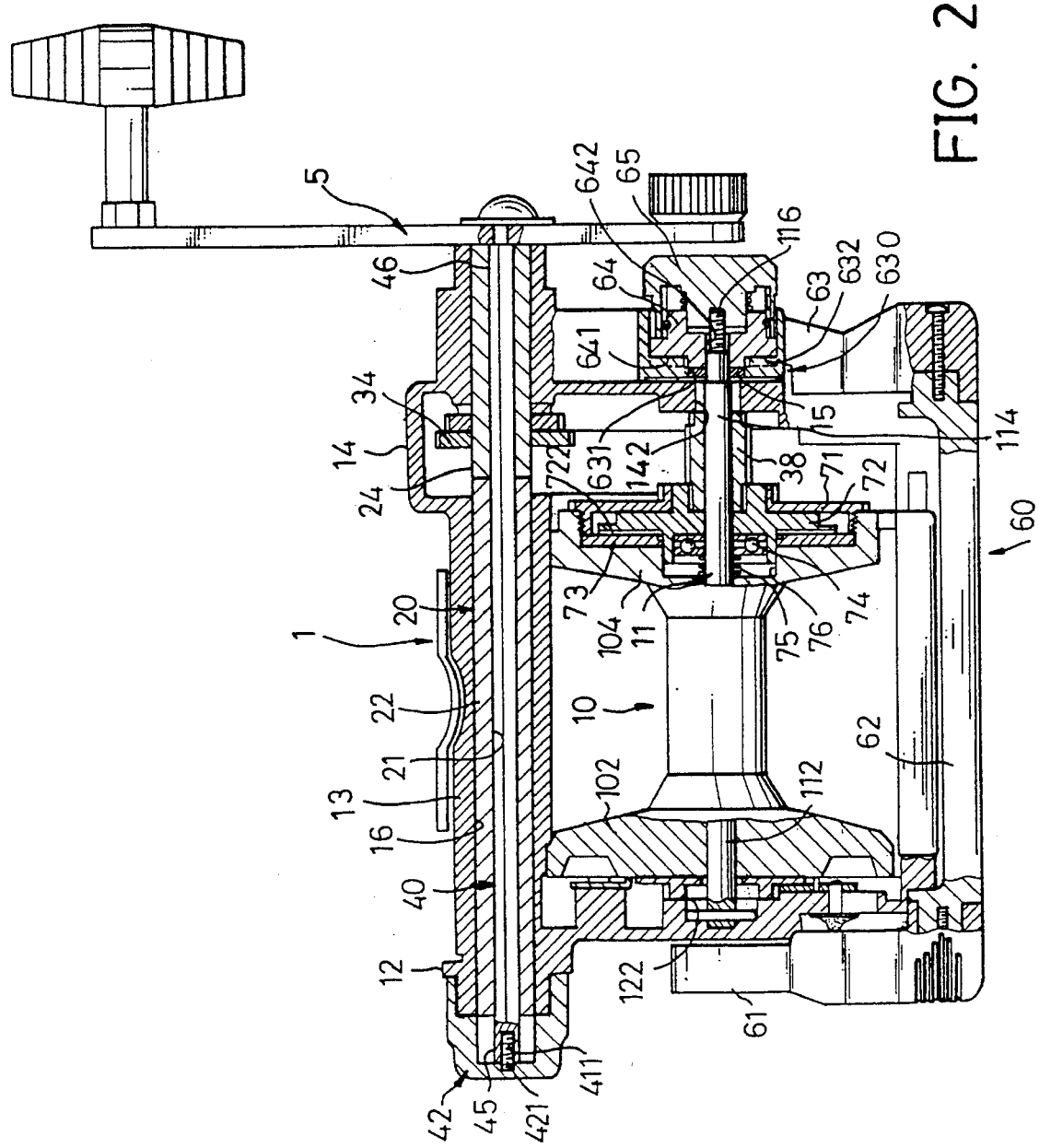
FIG. 2 is a front plan partially cross-sectional view of the fishing reel as shown in FIG. 1.

Referring to the drawings and initially to FIGS. 1 and 2, a fishing reel in accordance with the present invention comprises a reel body 1 including a first side frame 12, a second side frame 14 and an elongated frame 13 formed therebetween. A first passage 16 is longitudinally defined in the elongated frame 13 and extends through the first and second side frames 12 and 14. A driven shaft 20 is rotatably mounted in the first passage 16 and has a second passage 21 longitudinally defined therein. Preferably, the driven shaft 20 includes two secondary shafts 22 and 24 each having two lug portions 220 and 240 which are coupled together to form the driven shaft 20.

A drive shaft 40 is detachably mounted in the second passage 21 for rotating the driven shaft 20 therewith and includes a first end 45 and a second end 46. An inner thread 411 is formed in the first end 45 of the drive shaft 40. Preferably, the second passage 21 and the drive shaft 40 are hexagonal in section. A handle portion 5 is engaged with the second end 46 of the drive shaft 40 for rotating the drive shaft 40 therewith.

A cap 42 is rotatably mounted around one of the first and second side plates 12 and 14. A stud 421 is fixedly formed in the cap 42 and is threadedly engaged in the inner thread 411 of the first end 45 of the drive shaft 40 for retaining the drive shaft 40 in the second passage 21 of the driven shaft 20.

A spool shaft 11 is slidably mounted in the reel body 1 and has a first end 112 retained in a hole 122 of the first side frame 12 and a second end 114 retained in a hole 142 of the second side frame 14. An outer thread 116 is formed on the second end 114 of the spool shaft 11 and protrudes therefrom. A spool 10 is rotatably mounted around the spool shaft 11 and has a first end portion 102 located adjacent the first side frame 12 and a second end portion 104 located adjacent the second side frame 14.

A drag washer 73 is fixedly mounted on the second end portion of the spool 10. A compartment 76 is defined in the second end portion 104 of the spool 10 for receiving a biasing member 75 therein. A stop 72 is mounted around the second end 114 of the spool shaft 11 and is received in the second end portion 104 of the spool 10 to be urged on the biasing member 75 such that a space 722 is defined between the drag washer 73 and the stop 72. Preferably, a retaining member 71 is threadedly engaged with the second end portion 104 of the spool 10 for retaining the stop 72 and the biasing member 75 in the second end portion 104 of the spool 10. In addition, a ball bearing 74 is rotatably mounted between the stop 72 and the spool shaft 11.

A transmission mechanism 35 is mounted between the driven shaft 20 and the spool shaft 11 and includes a drive gear 34 fixedly mounted around the secondary shaft 24 of the driven shaft 20 to rotate therewith. A pinion 38 is fixedly engaged with the stop 72 and is rotatably mounted around the second end 114 of the spool shaft 11 and is driven to rotate by means of the drive gear 34 via two meshing gears 36 and 37 so as to rotate the stop 72 therewith.

A rotation control mechanism 60 is mounted on the first and second side frames 12 and 14 and is engaged with the second end 114 of the spool shaft 11 such that the spool shaft 11 together with the spool 10 is moved by means of the rotation control mechanism 60 between a first position where the stop 72 is urged on the drag washer 73 such that the spool 10 is rotated in concert with the pinion 38 by engagement of the stop 72 and the drag washer 73, and a second position where the stop 72 is disengaged with the drag washer 73.

The rotation control mechanism 60 comprises a first drag control lever 61 and a second drag control lever 63 pivotally mounted on the first and second side frames 12 and 14 respectively. A linking bar 62 is connected between the first and second drag control levers 61 and 63. A housing 630 is formed on the second drag control lever 63 and is pivoted on a projection 15 which is formed on the second side frame 14 and protrudes outwardly therefrom to be received in a hole 631 of the housing 630. Two bosses 632 are formed in the housing 630.

An adjuster block 64 is slidably mounted around the second end 114 of the spool shaft 11 and is received in the housing 630. Preferably, the second end 114 of the spool shaft 11 has square section in correspondence with a square hole 642 defined in the adjuster block 64. Two recesses 641 are defined in the adjuster block 64 for detachably receiving the bosses 632 therein respectively. A drag knob assembly 65 is mounted on the adjuster block 64 and is threadedly engaged with the outer thread 116 of the spool shaft 11.

By such an arrangement, the housing 630 is pivoted between a first position where the bosses 632 are detached from the associated recesses 641 and are urged on the adjuster block 64 such that the adjuster block 64 is moved to urge on the drag knob assembly 65, thereby moving the drag knob assembly 65 together with the outer thread 116 of the spool shaft 11 so as to move the spool 10 together with the drag washer 73 to urge on the stop 72, and a second position where the bosses 632 are received in the associated recesses 641 such that the drag washer 73 is detached from the stop 72 by means of the biasing member 75.

In operation, the drive shaft 40 is rotated by the handle portion 5 so as to rotate the driven shaft 20 which in turn rotates the drive gear 34 which subsequently rotate the pinion 38 together with the stop 72 via the meshing gears 36 and 37. At this moment, the drag washer 73 is not in contact with the stop 72, so, the spool 10 is not rotated by the pinion 38 together with the stop 72 such that the handle portion 5 idles.

When the linking bar 62 is pressed so as to pivot the housing 630 about the projection 15 via the second drag control lever 63, the bosses 632 are detached from the associated recesses 641 to urge on the adjuster block 64 which is forced to urge on the drag knob assembly 65 which is forced to move the spool shaft 11 forwardly via the outer thread 116 thereof, thereby pushing the second end portion 104 of the spool 10 together with the drag washer 73 to urge on the stop 72 such that the spool 10 is rotated by the pinions 38 by engagement between the drag washer 73 and the stop 72.

When the linking bar 62 is returned to the original position, the bosses 632 are again received in the recesses 641, the drag washer 73 together with the spool 10 is urged by the biasing member 75 to detach from the stop 72 such that the pinion 38 performs an idle operation.

By such an arrangement, the right handed user is able to drive the handle portion 5 with his right hand and simultaneously handle the rotation control mechanism 60 with a finger of his left hand, and vice versa for the left handed user, i.e., the left handed user is capable of driving the handle portion 5 with his left hand and simultaneously operating the rotation control mechanism 60 with a finger of his right hand.

Figure 3:
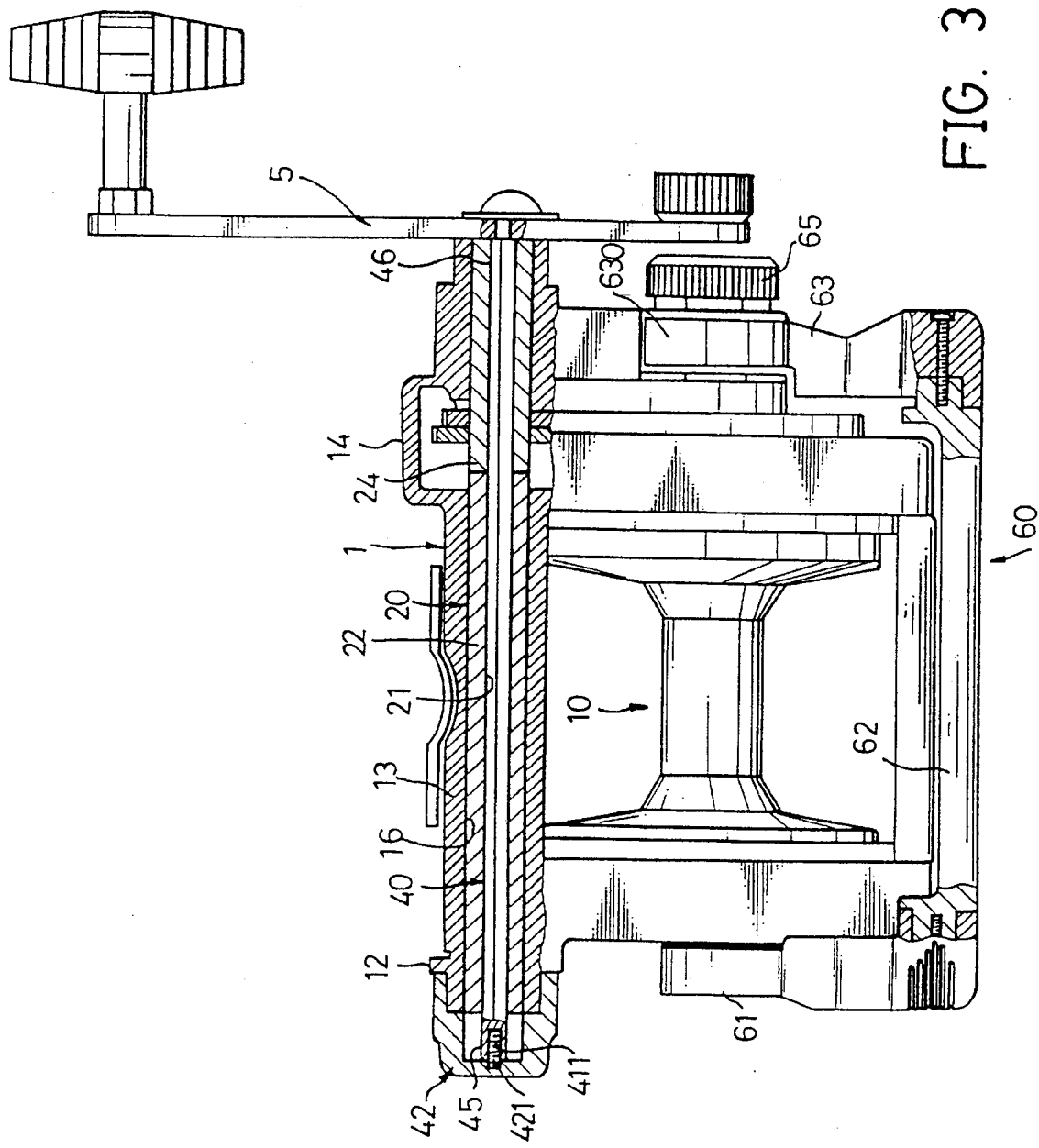
FIG. 3 is a front plan partially cross-sectional view of the fishing reel, illustrating a situation for a right handed user.
Figure 4:
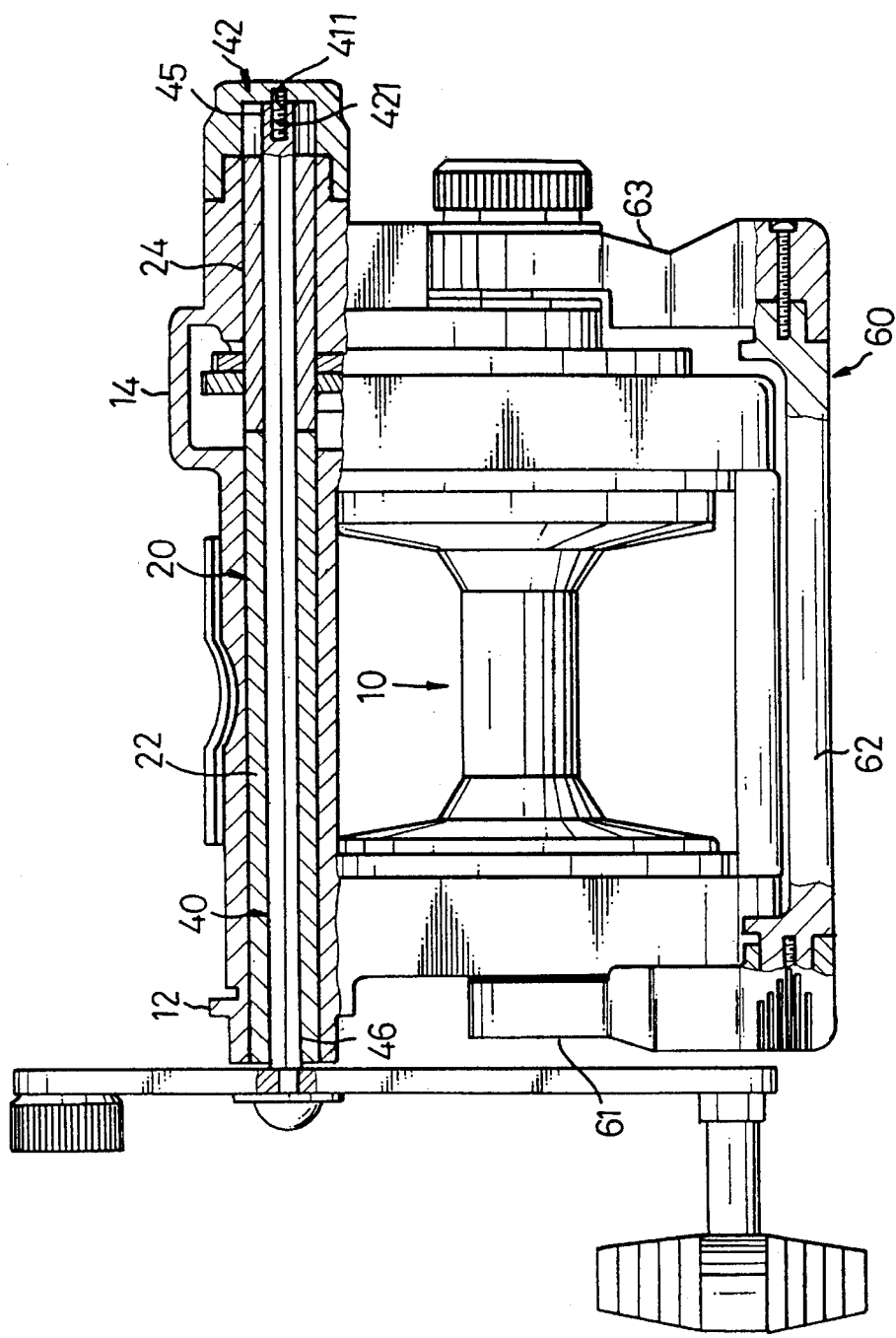
FIG. 4 is a front plan partially cross-sectional view of the fishing reel, illustrating a situation for a left handed user.

Referring to FIG. 3, the cap 42 is mounted on the first side frame 12 and the stud 421 is threadedly engaged in the inner thread 411 of the first end 45 of the drive shaft 40. Referring to FIG. 4, the cap 42 is mounted on the second side frame 14 and the stud 421 is threadedly engaged in the inner thread 411 of the first end 45 of the drive shaft 40.

By such an arrangement, the fishing reel in accordance with the present invention is suitable for both right handed and left handed users.

It should be clear to those skilled in the art that further embodiments of the present invention may be made without departing from the teachings of the present invention.

What is claimed:

1. A fishing reel comprising:

a reel body (1) including a first side frame (12), a second side frame (14) and an elongated frame (13) formed therebetween, a first passage (16) longitudinally defined in said elongated frame (13) and extending through said first and second side frames (12) and (14);

a driven shaft (20) rotatably mounted in said first passage (16) and having a second passage (21) longitudinally defined therein;

a drive shaft (40) detachably mounted in said second passage (21) for rotating said driven shaft (20) therewith and including a first end (45) and a second end (46), an inner thread (411) formed in the first end (45) of said drive shaft (40);

a handle portion (5) engaged with the second end (46) of said drive shaft (40) for rotating said drive shaft (40) therewith;

a cap (42) rotatably mounted on one of said first and second side frames (12) and (14), a stud (421) fixedly formed in said cap (42) and threadedly engaged in said inner thread (411) of the first end (45) of said drive shaft (40) for retaining said drive shaft (40) in said second passage (21) of said driven shaft (20);

a spool shaft (11) slidably mounted in said reel body (1) and having a first end (112) retained in said first side frame (12) and a second end (114) retained in said second side frame (14), an outer thread (116) formed on the second end (114) of said spool shaft (11) and protruding therefrom;

a spool (10) rotatably mounted around said spool shaft (11) and having a first end portion (102) located adjacent said first side frame (12) and a second end portion (104) located adjacent said second side frame (14), a drag washer (73) fixedly mounted on the second end portion (104) of said spool (10), a compartment (76) defined in the second end portion of said spool (10), a biasing member (75) received in said compartment (76), a stop (72) mounted around the second end (114) of said spool shaft (11) and urged by said biasing member (75) such that a space (722) is defined between said drag washer (73) and said stop (72);

a transmission mechanism (35) mounted between said driven shaft (20) and said spool shaft (11) and including a drive gear (34) fixedly mounted around said driven shaft (20) to rotate therewith, a pinion (38) fixedly engaged with said stop (72) and rotatably mounted around the second end (114) of said spool shaft (11) and driven to rotate by means of said drive gear (34) so as to rotate said stop (72) therewith; and a rotation control mechanism (60) mounted on said first and second side frames (12) and (14) and engaged with said second end (114) of said spool shaft (11) such that said spool shaft (11) together with said spool (10) is moved by means of said rotation control mechanism (60) between a first position where said stop (72) is urged on said drag washer (73) such that said spool (10) is rotated in concert with said pinion (38) by engagement of said stop (72) and said drag washer (73), and a second position where said stop (72) is disengaged with said drag washer (73).

2. The fishing reel in accordance with claim 1, wherein said rotation control mechanism (60) comprises a first drag control lever (61) and a second drag control lever (63) pivotally mounted on said first and second side frames (12) and (14) respectively, a linking bar (62) connected between said first and second drag control levers (61) and (63), a housing (630) formed on said second drag control lever (63) and pivoted on said second side frame (14), at least one boss (632) formed in said housing (630), an adjuster block (64) slidably mounted around the second end (114) of said spool shaft (11) and received in said housing (630), at least one recess (641) defined in said adjuster block (64) for detachably receiving said boss (632) therein, a drag knob assembly (65) mounted on said adjuster block (64) and threadedly engaged with said outer thread (116) of said spool shaft (11), whereby, said housing (630) is pivoted between a first position where said boss (632) is detached from said recess (641) and is urged on said adjuster block (64) such that said adjuster block (64) is moved to urge on said drag knob assembly (65), thereby moving said drag knob assembly (65) together with said outer thread (116) of said spool shaft (11) so as to move said spool (10) together with said drag washer (73) to urge on said stop (72), and a second position where said boss (632) is received in said recess (641) such that said drag washer (73) is detached from said stop (72) by means of said biasing member (75).

* * * * *